UNITED STATES PATENT OFFICE.

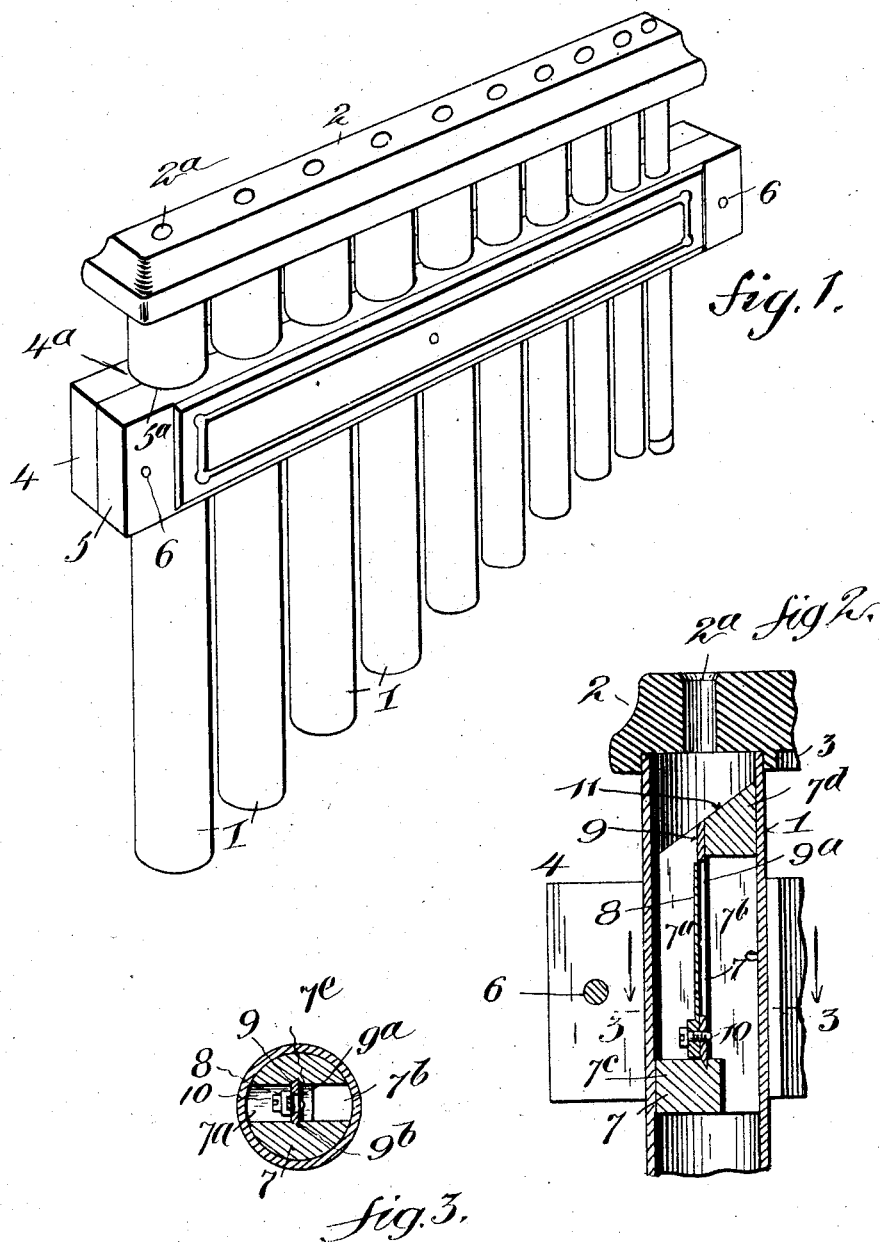

SAMUEL SLOCUM BARLOW, OF CHICAGO, ILLINOIS.

MOUTH-ORGAN.

No. 880,709.  Specification of Letters Patent.  Patented March 3, 1908.

Application filed March 23, 1907. Serial No. 364,027.

*To all whom it may concern:*

Be it known that I, SAMUEL SLOCUM BARLOW, a citizen of the United States, and resident of Chicago, Cook county, Illinois, have invented certain new and useful Improvements in Mouth-Organs, of which the following is a specification.

The object of my invention is to provide an improved mouth organ or harmonica, whereby the tones produced will be resonant and full, corresponding to the tones produced by pipe organs.

In carrying out my invention I provide a series of pipes or tubes of varying length and diameter, and to the adjacent ends thereof I apply a mouth-piece having apertures alined with said pipes, and within said pipes I provide reeds, said pipes and reeds being arranged to produce varying tones as desired. In the arrangements I have illustrated I provide plugs having bores respectively opening through opposite ends and communicating through an intermediate slot, and a reed secured within one of said bores and alined with the corresponding slot, which reed I have shown attached to a slotted base that is suitably fitted within said bore.

Reference is to be had to the accompanying drawings forming part hereof, wherein Figure 1 is a perspective view of a mouth organ embodying my improvements, Fig. 2 is a central section through one of the pipes or tubes, and Fig. 3 is a cross section on the line 3, 3 in Fig. 2.

The numeral 1 indicates pipes or tubes, preferably of metal, and shown of varying length and diameter, which are open at both ends, and at 2 is a suitable mouth-piece attached to the corresponding ends of pipes 1 and provided with apertures $2^a$ alined with the bores in said tubes. I have shown the mouth-piece 2 provided with recesses or counter-bores 3 concentric with the openings $2^a$ and receiving the corresponding ends of pipes 1, which mouth-piece may be secured upon said pipes by a close fit between the bores 3 and said pipes. The pipes 1 are also shown held and retained securely in position by clamping pieces 4, 5 having opposed semi-circular openings $4^a$, $5^a$ snugly receiving the corresponding pipes 1, which clamping pieces may be held together by rivets, bolts or the like 6, whereby pipes 1 are securely held with relation to mouth-piece 2.

At 7 is a plug fitted snugly within the bores of pipes 1 and shown provided with recesses or bores $7^a$, $7^b$ which enter said plug from opposite ends, providing closures $7^c$, $7^d$ at the inner or opposite ends of bores $7^a$, $7^b$, the bores $7^a$, $7^b$ communicating along adjacent sides, as through the opening or passage $7^e$, so that air blown into the bore $7^a$ will pass out through bore $7^b$.

At 8 is a reed secured within plug 7 in line with the passage $7^e$ and shown having its free end projecting toward the mouth-piece opening $2^a$ so as to vibrate in the direction of the passage $7^e$. I have shown reed 8 as secured to a plate or base 9 that is provided with an opening or slot $9^a$ which communicates with the bores $7^a$, $7^b$ through passage $7^e$, the reed 8 being located in position to vibrate in line with slot $9^a$. The reed at its lower part may be secured to plate 9 by a screw, rivet, or the like 10.

I have shown plate 9 connected with plug 7 by a miter joint, said plate being shown beveled at its edges at $9^b$ and entering corresponding grooves in the walls of bore $7^a$ of plug 7. The upper edge of plug 7 is shown beveled or inclined downwardly toward bore $7^a$, as at 11, to cause the air blown into the pipe 1 to travel freely toward said bore. Plug 7, made in the manner above stated, may be held within the corresponding pipe 1 by frictional engagement therewith and may be pushed in or out of the same to the desired position to produce the desired tone or resonance.

While I have shown one of the pipes or tubes as provided with a plug 7 and reed 8, it will be understood that each of the pipes will be provided with a corresponding plug having a suitable reed to produce the tone desired according to the scale of the mouth-organ.

My improved mouth organ may be operated in the usual way by blowing or sucking through the apertured mouth-piece 2 and the reeds 8 will be arranged accordingly with respect to their corresponding slots $9^a$, for blowing or suction in well-known manner.

Having now described my invention what I claim is:—

1. A mouth-organ comprising a plurality of pipes located side by side and having one set of ends in substantial alinement and open at the opposite ends, an apertured mouth-piece attached to the adjacent alined ends of said pipes, means for securely holding said pipes side by side in operative position, and reeds within said pipes.

2. A mouth-organ comprising a plurality of pipes, having one set of ends in substantial alinement, an apertured mouth-piece attached to the adjacent alined ends of said pipes, means for securely holding said pipes in operative position, reeds within said pipes, and means for supporting said reeds in said pipes adjustably in the longitudinal direction of said pipes.

3. A mouth-organ comprising a plurality of pipes, having one set of ends in substantial alinement, an apertured mouth-piece attached to the adjacent alined ends of said pipes, plugs within said pipes having bores communicating by a passage, said bores being respectively open at their outer ends and closed at their inner ends, a slotted plate within one bore, and a reed attached to said plate and alined with its slot, the end of said plug adjacent said mouth-piece, being inclined downwardly toward the bore that opens toward the mouth-piece opening.

4. A mouth-organ comprising a plurality of pipes located side by side, clamp pieces securing said pipes firmly together, an apertured mouth piece having recesses on one side receiving the adjacent ends of said pipes, and means for producing musical notes by the flow of air through said pipes.

SAMUEL SLOCUM BARLOW.

Witnesses:
ANTHONY ALEXANDER KUNZE,
SAM. MEYER.